US007805109B2

(12) United States Patent
Tsai et al.

(10) Patent No.: US 7,805,109 B2
(45) Date of Patent: Sep. 28, 2010

(54) DETACHABLE EARPHONE STRUCTURE

(75) Inventors: Tse-Ming Tsai, Sindian (TW); Chen-Yi Hsiao, Sindian (TW); Shang-Hsing Chung, Sindian (TW)

(73) Assignee: Cal-Comp Electronics and Communications Company Limited, Taipei (TW)

( * ) Notice: Subject to any disclaimer, the term of this patent is extended or adjusted under 35 U.S.C. 154(b) by 489 days.

(21) Appl. No.: 11/850,740

(22) Filed: Sep. 6, 2007

(65) Prior Publication Data

US 2009/0068945 A1 Mar. 12, 2009

(51) Int. Cl.
*H04B 7/00* (2006.01)
*H04M 1/00* (2006.01)

(52) U.S. Cl. .................. 455/41.2; 455/41.3; 455/569.1; 455/575.2; 455/575.3

(58) Field of Classification Search .............. 455/569.1, 455/41.2, 41.3, 550.1, 90.1, 90.2, 90.3, 575.1, 455/575.2, 575.6
See application file for complete search history.

(56) References Cited

FOREIGN PATENT DOCUMENTS

TW M261949 4/2005

*Primary Examiner*—Eugene Yun
(74) *Attorney, Agent, or Firm*—Chun-Ming Shih; HDLS IPR Services

(57) ABSTRACT

A detachable earphone structure includes an earphone body and a transmitter detachable from the earphone body. The earphone body has an opening portion, a pair of connecting terminals installed in the opening portion and electrically connected to an internal circuit. The transmitter has a pair of contact terminals stored in the opening portion of the earphone body or detachably connected to the earphone body for electrically conducting the connecting terminal and the contact terminal through the contact of the connecting terminal with the contact terminal.

4 Claims, 6 Drawing Sheets

DETACHABLE EARPHONE STRUCTURE

BACKGROUND OF THE INVENTION

1. Field of the Invention

The present invention relates to an earphone structure, and more particular to a detachable earphone structure with a modular design such that an earphone body can be separated from a transmitter.

2. Description of Prior Art

As science and technology advance, increasingly more technologies such as infrared, radio and Bluetooth technologies utilize a wireless earphone to free various digital devices from the binding of cables. Bluetooth is one of the global wireless connection standards, and also a wireless transmission technology for communications and computers, and its transmitted contents can be data and sound with the features of a large transmission range, a high transmission volume, an encryption for protecting the data, and a Bluetooth transmission not interfered by electromagnetic waves.

A popular application of the Bluetooth technology is used for mobile phones. As researches show that electromagnetic waves of mobile phones are harmful to human health, and the Bluetooth technology is low-power, and thus if a user wears a transmitter (or a Bluetooth earphone) of a mobile phone bundled with Bluetooth accessories at the user's ear, the user can receive incoming phone calls without touching the phone with the user's face, so as to reduce the harm of the electromagnetic waves produced by the mobile phones. Another advantage of using Bluetooth earphone resides on that its application concurrently takes the driving safety of the user and others into consideration.

A common wireless earphone is disclosed in R.O.C. Pat. No. M261949 entitled "Adjustable wireless earphone", and the wireless earphone comprises: an earphone body and a hanging portion connected at an appropriate position of the earphone body, wherein the hanging portion is connected to the earphone body by a contractible adjusting rod, so that the structure of the adjusting rod allows an ear hook of the hanging portion to be adjusted to an appropriate position and angle for its wearing onto a user's ear. The present invention discloses an earphone structure that can be adjusted to fit the ears of different users, and also indicates that the size of earphones of this sort is too large, and users have to change the wearing of the earphone to another ear from time to time in order to prevent a heavy burden to the same ear. Further, the ear hook is protruded from the earphone body, which makes the overall size of the earphone even larger, and thus a design with larger storage and package spaces is required for both users and manufacturers.

In view of the foregoing shortcomings of the prior art, the inventor of the present invention based on years of experience in the related industry to conduct experiments and modifications, and finally developed a detachable earphone structure in accordance with the present invention.

SUMMARY OF THE INVENTION

Therefore, it is a primary objective of the present invention to provide a detachable earphone structure, wherein a transmitter of an earphone can be detached from an earphone body, and thus the transmitter is a module of the earphone that can be combined with or detached from the earphone body anytime.

Another objective of the present invention is to provide a light and handy telephone device, wherein a user simply plugs the transmitter into the user's cochlea, places the earphone body on the user's body, and connects the transmitter with the earphone body by a connecting cable since the transmitter can be detached from the earphone body, and such arrangement can significantly reduce the weight of the earphone exerted onto the user's ear.

A further objective of the present invention is to provide an easy-to-store structure, wherein the earphone body has an opening portion for storing the transmitter therein, and the connecting terminal and the contact terminal are electrically conducted, and the transmitter is detachably connected to the earphone body, and the transmitter uses a T-shape shaft as a connecting tool to adjust the position of the transmitter.

To achieve the foregoing objectives, the present invention provides a detachable earphone structure, comprising: an earphone body and a transmitter detachable from the earphone body, wherein the earphone body has an opening portion, a pair of connecting terminals installed in the opening portion, and a pair of electrode terminals installed in the transmitter, and the transmitter can be stored into the opening portion of the earphone body, and the transmitter can be detachably connected to the earphone body for electrically conducting the connecting terminal and the contact terminal, or the transmitter can be detached from the earphone body but still connected to the earphone body by a connecting cable having two connecting ends, so that users can still use the earphone in a detached mode.

To prevent an incorrect connection of the electrodes of the connecting terminal and the contact terminal, the present invention provides a foolproof design of a positioning structure having a different shape and disposed on a positioning pillar under the transmitter to assure the correct connection of the electrodes of the transmitter and the earphone body.

Further, a T-shape shaft is installed between the transmitter and the earphone body to serve as a connecting tool, and the axle assembly of the T-shape shaft allows the transmitter to have an angular adjustment of the earphone body. The T-shape shaft can be used for adjusting the transmitter to an angle perpendicular to the earphone body when the earphone is in use, and storing the transmitter into the earphone body when the earphone is not in use.

Compared with the prior art, the present invention has the following effects:

1. The invention breaks through the design of traditional wireless earphones by providing a design concept of a Bluetooth earphone, and the innovative design modularizes the earphone structure and allows the earphone to be stored into the earphone body.

2. The invention comes with a small earphone structure to avoid a heavy burden to a user's ear that wears the earphone. Besides the earphone body, no other structure is exposed from the earphone body, and thus the overall volume of the earphone can be reduced, and the invention can save the storage and package spaces for users and manufacturers.

BRIEF DESCRIPTION OF DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

The technical characteristics, features and advantages of the present invention will become apparent in the following detailed description of the preferred embodiments with reference to the accompanying drawings. The drawings are provided for reference and illustration only, but not intended for limiting the present invention.

Figure 1:
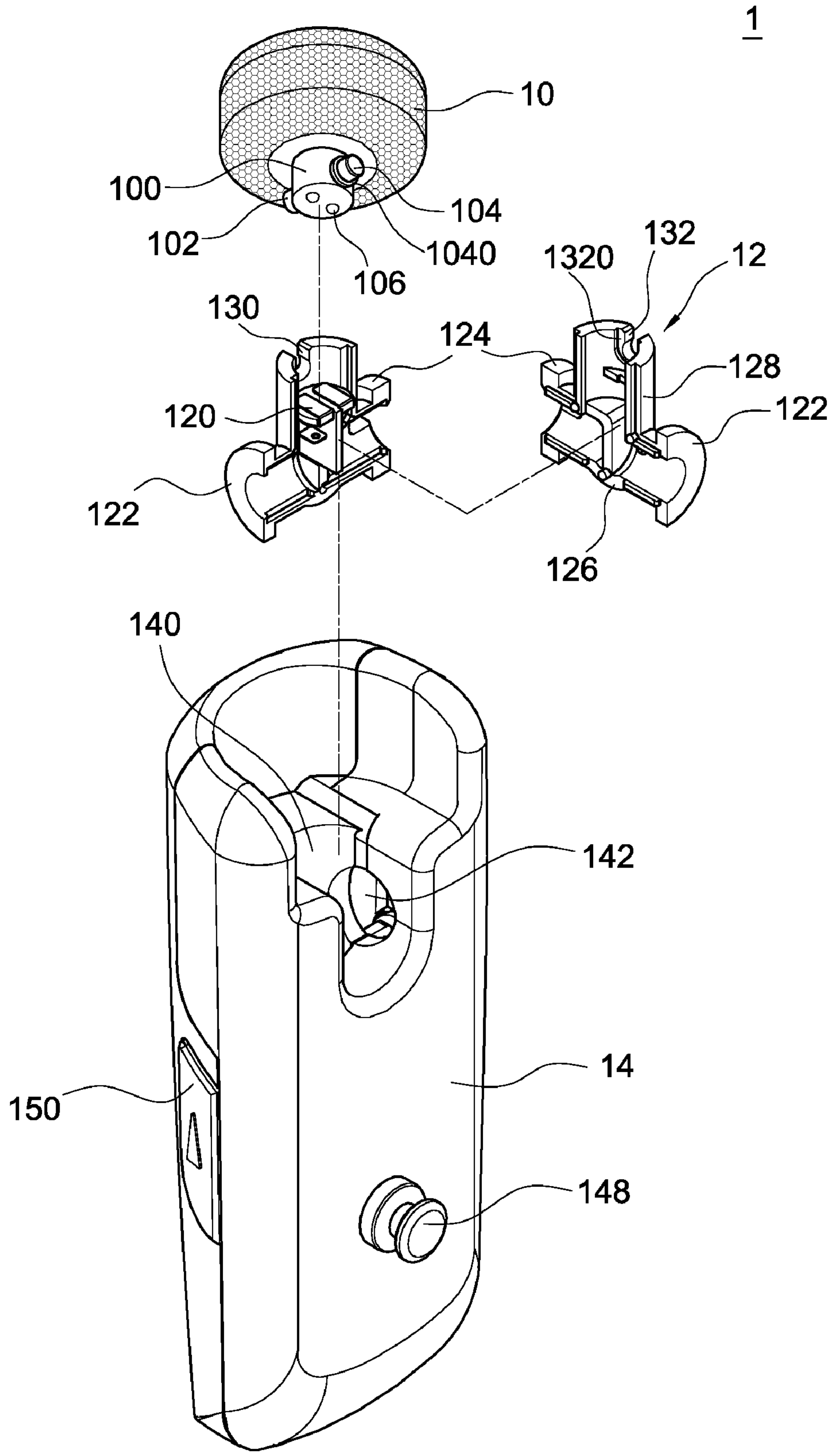
FIG. 1 is an exploded view of a first preferred embodiment of the present invention.

Referring to FIG. 1 for an earphone structure of a first preferred embodiment of the present invention, the earphone structure comprises a transmitter 10, a T-shape shaft 12 and an earphone body 14, wherein the transmitter 10 can be detached from the earphone body 14 and the transmitter installs a speaker and various electronic components therein; the earphone body 14 includes an opening portion 140, and a shaft hole 142 disposed horizontally in the opening portion 140 and corresponding to the T-shape shaft 12, and serving as a space for storing the transmitter 10, and this embodiment installs a connecting terminal 120 in the T-shape shaft 12 or in the opening portion 140 for electrically connecting an internal circuit of the earphone 1; the earphone body 14 further includes basic components and electronic circuits such as a transmitter 148 and an ON button 150. The connecting terminal 120 can be an electrode plate, and the elasticity of the electrode plate can improve the contact effect.

The T-shape shaft 12 is installed in the shaft hole 142 of the earphone body 14, and the position limiting design of semi-circular protruding rings 122, 124 disposed horizontally on both ends of a transverse shaft 126 allows the T-shape shaft 12 to rotate and move with respect to the earphone body 14 by using the transverse shaft 126 for a variation of different angles, and a vertical shaft 128 includes a connecting terminal 120 disposed vertically therein. The transmitter 10 is detachably connected to the earphone body 14, and the transmitter 10 includes a positioning pillar 100 protruded from the bottom of the transmitter 10, and a pair of elastically contractible contact terminals 106 installed inside the positioning pillar 100.

In addition, the T-shape shaft 12 further includes two positioning grooves 130, 132 disposed on the vertical shaft 128 of the transverse shaft for combining the transmitter 10, and latching rods 102, 104 with different specifications and structures and respectively disposed on both sides of the positioning pillar 100 of the transmitter 10, wherein the positioning grooves 130, 132 include different positioning structures of the latching rods 102, 104 under the transmitter 10 for assuring the correct connection of electrodes of the transmitter 10 and the T-shape shaft 12. The way of connecting the positioning groove and the latching rod in accordance with this preferred embodiment is one of the connection methods only, and structures such as a snap-in structure, a latch structure, or a magnetic connecting structure can be used as a substitute.

Figure 2:
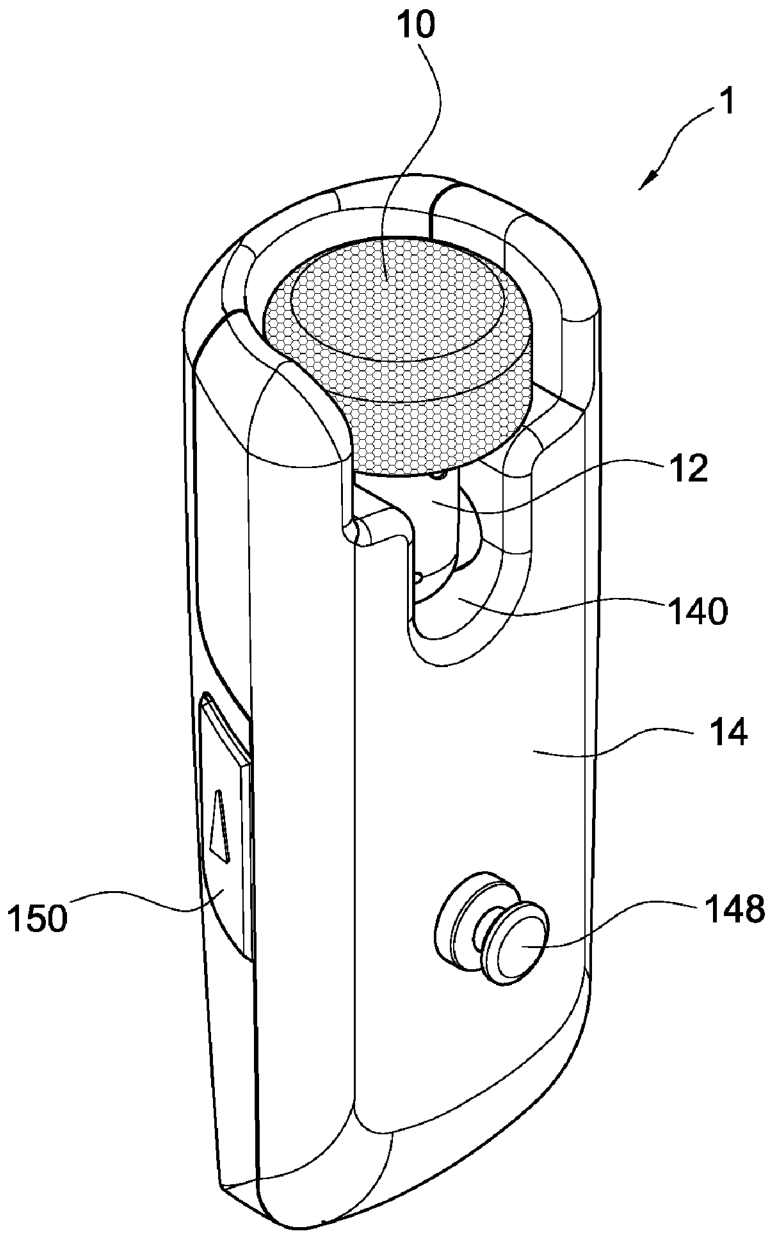
FIG. 2 is a perspective view of a first preferred embodiment of the present invention.
Figure 3:
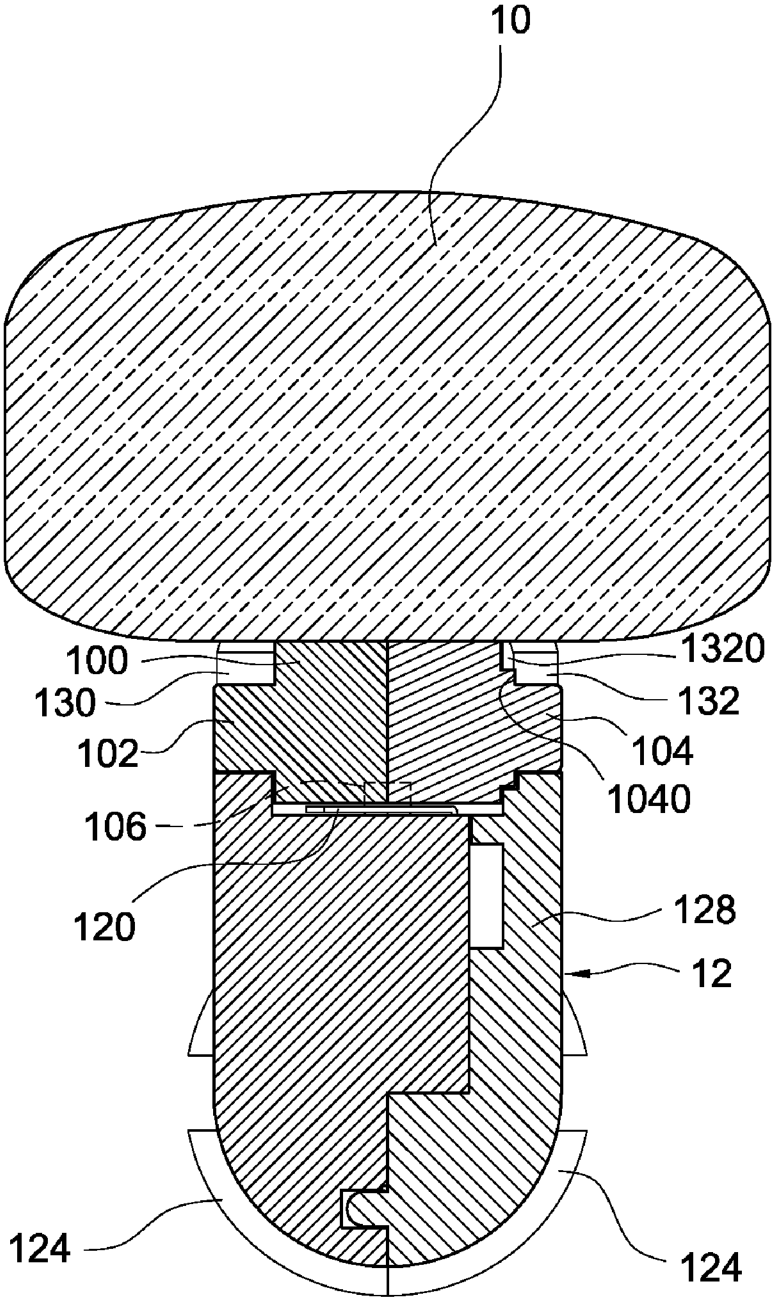
FIG. 3 is a section view of installing a transmitter and a T-shape shaft in accordance with the present invention.

Referring to FIG. 2 for a perspective view of an assembly in accordance with a first preferred embodiment of the present invention, an earphone 1 does not have extra external structures such as an ear hook or a transmitter exposed to the outside, since a transmitter 10 can be stored into an earphone body 14, and thus the invention can save storage spaces. In FIG. 2, the earphone of the invention is stored when it is not in use. The T-shape shaft 12 is installed through the opening portion 140 into the shaft hole 142 of the earphone body 14, and the earphone body 14 is turned at different angles by the transverse shaft 126, and the transmitter 10 is combined with the positioning grooves 130, 132 of the T-shape shaft 12 by the latching rods 102, 104 of the positioning pillar 100. By turning the T-shape shaft 12, the transmitter 10 can be turned out from the earphone body 14, and the transmitter 10 can be set to an angle perpendicular to the earphone body 14 by adjusting the T-shape shaft 12 as shown in FIG. 3. Since the earphone of the invention comes with a small volume, the invention can prevent a heavy burden to the user's ear that wears the earphone, and users can plug the transmitter 10 directly into their cochlea to complete wearing the earphone.

Figure 4:
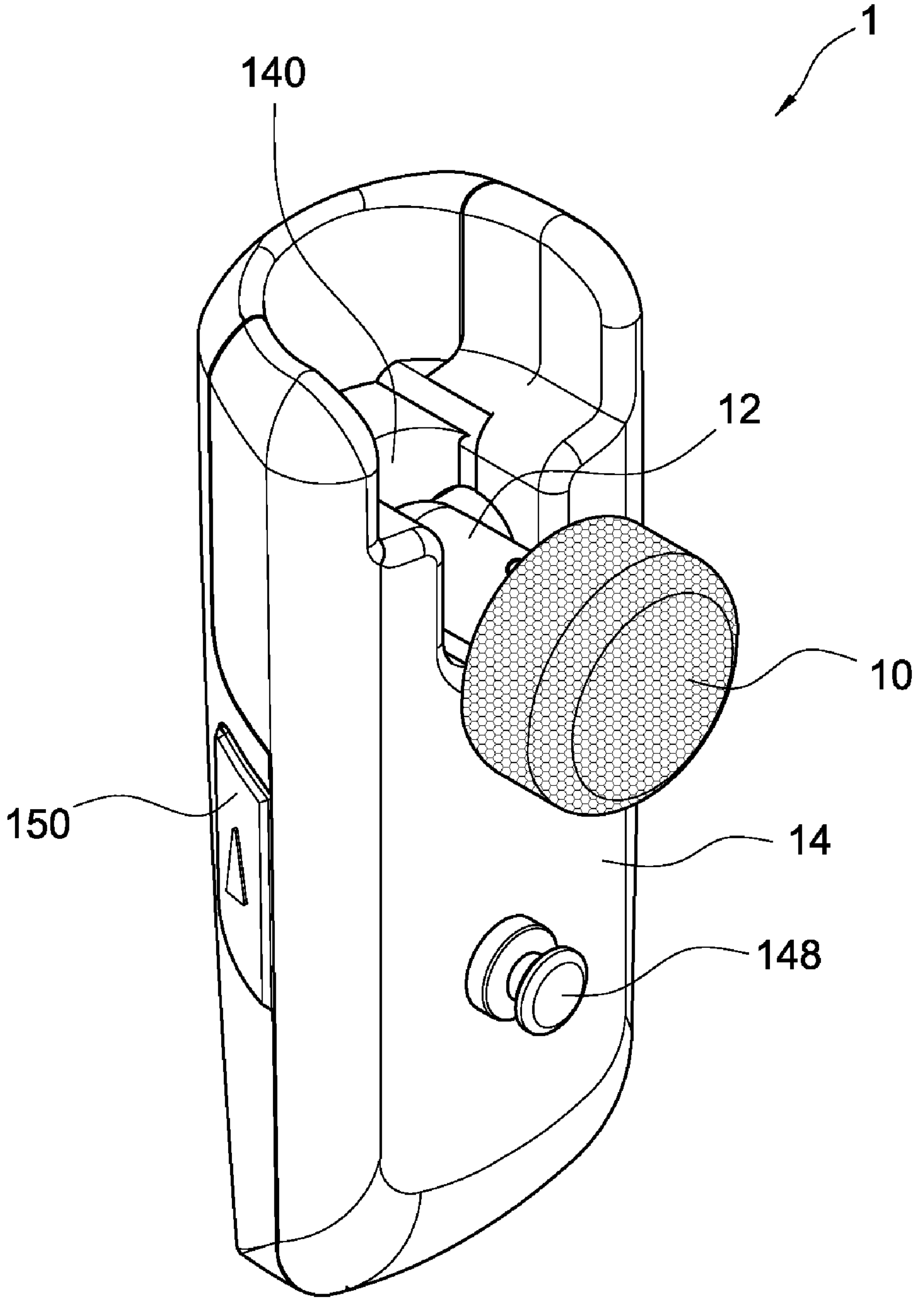
FIG. 4 is a schematic view of an application of a first preferred embodiment of the present invention.

Referring to FIG. 4 for a further description of the combination of the transmitter and the T-shape shaft, the transmitter 10 can be detached from the earphone body 14 directly, or detached from the T-shape shaft 12 through the T-shape shaft 12 indirectly. Regardless of either method, the transmitter 10 can be combined with other parts through the positioning pillar 100. The transmitter 10 is electrically connected to the earphone body 14, such that signals can be transmitted to the transmitter 10. Thus, it is very important to connect the electrodes correctly, and the transmitter 10 of the invention provides a modular design, wherein the elastically contractible contact terminal 106 in the positioning pillar 100 is pressed, and the pressing force at the connecting terminal 120 of the T-shape shaft 12 guarantees an effective contact. In another structure, latching rods 102, 104 of different specifications and structures are disposed on a lateral side of the positioning pillar as shown in the figure, wherein the latching rod 104 has a flange 1040, so that the latching rod 104 can be combined with the positioning groove 132 having an internal embedded groove 1320 on the T-shape shaft 12 only, but cannot be combined with the positioning groove 130 on the other side, and the width of the internal embedded groove 1320 is greater than the width of the positioning groove 132 for restricting the position of combining the transmitter 10, so as to prevent an incorrect connection of electrodes.

Figure 5:
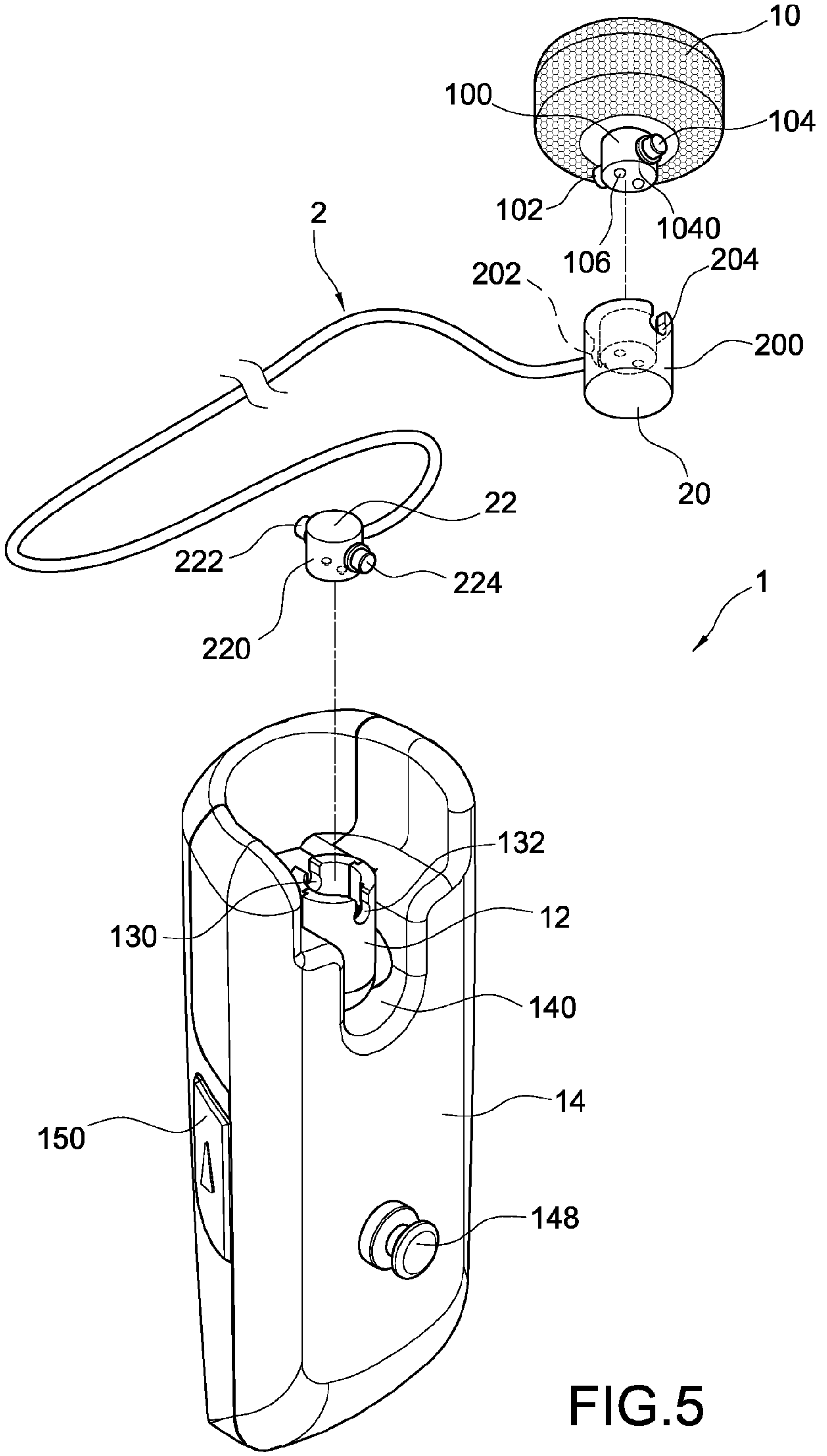
FIG. 5 is an exploded view of an application of a first preferred embodiment of the present invention.

Referring to FIG. 5 for an application of the present invention after the earphone structure is detached, the invention is characterized in that the transmitter 10 can be detached from the earphone body 14, not only reducing the weight of the earphone exerted onto a user's ear, but also allows users to put the earphone body 14 into their pocket or at an obvious place for the operation. Therefore, a connecting cable 2 having two connecting ends 20, 22 is connected to the transmitter 10 and the earphone body 14 respectively, and the structural design of a cylindrical pillar 200 of the connecting cable 2 is the same as the T-shape shaft at the connecting end 20 of the first preferred embodiment and includes two positioning grooves 202, 204 for combining the transmitter 10, and the positioning groove 202, 204 matches the latching rods 102, 104 under the transmitter 10 with a positioning structure of different shapes to assure the correct connection of the electrodes of the transmitter 10 and the connecting end 20. The structural design of another connecting end 22 of the connecting cable 2 is the same as the positioning pillar 100 of the transmitter 10 of the first preferred embodiment, and the shaft pillar 220 has latching rods 222, 224 of different specifications and structural designs to match with the positioning grooves 130, 132 of the T-shape shaft 12 and assure a correct connection of the electrodes of the connecting end 22 and the T-shape shaft 12. In this application, the connecting cable 2 can be connected with the transmitter 10 and the earphone body 14 for using the earphone at a detached mode.

Figure 6:
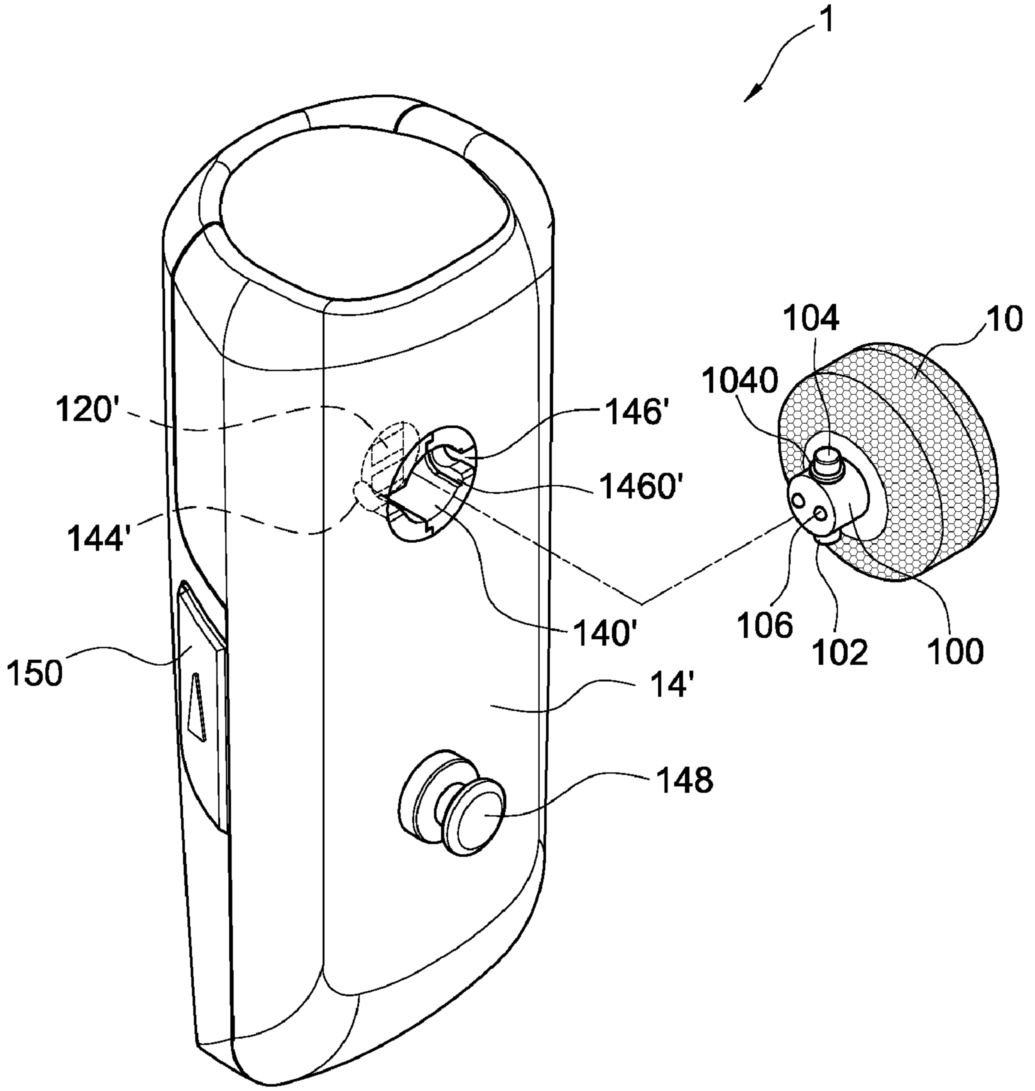
FIG. 6 is an exploded view of a second preferred embodiment of the present invention.

Referring to FIG. 6 for a second preferred embodiment of the present invention, the earphone body 14' has an opening portion 140' disposed on a side of the earphone body 14' directly, and a side of the earphone body 14' is attached to a user's ear, and the opening portion 140' does not include a connecting terminal 120', and the transmitter 10 has a contact terminal 106, and the transmitter 10 can be detachably connected to the earphone body 14'. In this embodiment, the transmitter 10 comes with a modular design, so that the transmitter 10 and the earphone body 14' can be combined when the earphone is in use, and the transmitter 10 and the earphone body 14' can be detached and stored into the earphone when the earphone is not in use, or a connecting cable having two connecting ends is used for connecting the transmitter 10 and the earphone body 14' respectively as shown in FIG. 5 to use the earphone at a detached mode.

To enhance the installation strength, two positioning grooves 144', 146' are created on the opening portion 140' for electrically connecting the transmitter 10, and a positioning structure with a different shape from the positioning grooves 144', 146' is designed to match with the latching rods 102, 104 under the transmitter 10, wherein the latching rod 104 has a flange 1040, so that the latching rod 104 can be combined with the positioning groove 146' having an internal embedded groove 1460' only.

The present invention is illustrated with reference to the preferred embodiment and not intended to limit the patent scope of the present invention. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A detachable earphone structure, comprising:

an earphone body, having an opening portion, and a shaft hole disposed horizontally in the opening portion;

a T-shape shaft, having a transverse shaft engaged in the shaft hole, a vertical shaft disposed perpendicular to the transverse shaft, and a pair of connecting terminals disposed in the vertical shaft; and a transmitter, capable of being received in the opening portion, having a speaker and a pair of contact terminals to electrically couple to the pair of connecting terminals, respectively, and detachably connected to the T-shape shaft, wherein the transmitter includes a positioning pillar protruded from the transmitter and plugged into the vertical shaft of the T-shape shaft.

2. The earphone structure as recited in claim 1, wherein the vertical shaft includes two positioning grooves disposed on an internal wall of the vertical shaft, and two latching rods disposed at corresponding positions of the positioning pillar respectively, and each latching rod is latched and coupled with each positioning groove.

3. The earphone structure as recited in claim 2, wherein the vertical shaft includes an internal embedded groove formed on an internal side of the positioning groove of the vertical shaft and having a width greater than the width of the positioning groove, and the positioning pillar includes a flange formed on an internal side of a latching rod of the positioning pillar and embedded into the internal embedded groove correspondingly.

4. The earphone structure as recited in claim 1, wherein the contact terminals are installed on a bottom surface of the positioning pillar, and the connecting terminals are formed inside the vertical shaft and corresponding to the bottom of the positioning pillar, so as to conduct and contact the contact terminals and the connecting terminals with each other.

* * * * *